US010031488B2

(12) United States Patent
Oshita

(10) Patent No.: US 10,031,488 B2
(45) Date of Patent: *Jul. 24, 2018

(54) RADIO WAVE RECEIVER, RADIO-CONTROLLED TIMEPIECE, SIGNAL OBTAINING METHOD AND STORAGE MEDIUM

(71) Applicant: CASIO COMPUTER CO., LTD., Shibuya-ku, Tokyo (JP)

(72) Inventor: Yuki Oshita, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/455,753

(22) Filed: Mar. 10, 2017

(65) Prior Publication Data

US 2017/0185050 A1 Jun. 29, 2017

Related U.S. Application Data

(62) Division of application No. 15/002,190, filed on Jan. 20, 2016, now Pat. No. 9,635,513.

(30) Foreign Application Priority Data

Mar. 18, 2015 (JP) .................................. 2015-054919

(51) Int. Cl.
H04W 24/00 (2009.01)
G04R 20/04 (2013.01)
(Continued)

(52) U.S. Cl.
CPC .............. *G04R 20/04* (2013.01); *G01S 19/14* (2013.01); *G01S 19/24* (2013.01); *H04W 52/34* (2013.01); *H04W 24/00* (2013.01)

(58) Field of Classification Search
CPC ......... G04R 20/04; G01S 19/14; G01S 19/24; H04W 52/34; H04W 24/00
(Continued)

(56) References Cited

U.S. PATENT DOCUMENTS 7,974,155 B2 * 7/2011 Matsuzaki ............. G04R 20/04
342/357.69
8,044,855 B2 10/2011 Hanabusa
(Continued)

FOREIGN PATENT DOCUMENTS

JP 2008157645 A 7/2008
JP 2009300274 A 12/2009
(Continued)

OTHER PUBLICATIONS

Japanese Office Action (and English translation thereof) dated May 9, 2017 issued in counterpart Japanese Application No. 2015-054919.

Primary Examiner — Mong-Thuy Tran
(74) Attorney, Agent, or Firm — Holtz, Holtz & Volek PC

(57) ABSTRACT

A radio wave receiver includes a radio wave reception processor which receives radio waves and obtains signals transmitted from positioning satellites from the received radio waves; and a processor which sets reception start timing of the radio waves by the radio wave reception processor and controls the radio wave reception processor to start reception. The processor sets the reception start timing so that following reception conditions are satisfied: (i) a total power consumption amount of a power amount necessary for positioning and a power amount according to an obtaining upper limit time from start timing of a positioning operation by the radio wave reception processor to when the radio wave reception processor obtains signals necessary for computing a present position and the positioning operation is equal to or less than a predetermined upper limit power
(Continued)

consumption amount, and (ii) the obtaining upper limit time is equal to or more than a predetermined reference time.

16 Claims, 7 Drawing Sheets

(51) Int. Cl.
*H04W 52/34* (2009.01)
*G01S 19/24* (2010.01)
*G01S 19/14* (2010.01)

(58) Field of Classification Search
USPC ....................................................... 455/456.1
See application file for complete search history.

(56) References Cited

U.S. PATENT DOCUMENTS

| | | |
|---|---|---|
| 2009/0135674 A1 | 5/2009 | Matsuzaki et al. |
| 2009/0140919 A1 | 6/2009 | Shingyoji et al. |
| 2009/0180356 A1 | 7/2009 | Fujisawa et al. |
| 2009/0309792 A1 | 12/2009 | Hanabusa |
| 2010/0054087 A1 | 3/2010 | Matsuzaki et al. |
| 2010/0220555 A1 | 9/2010 | Honda et al. |
| 2011/0063952 A1 | 3/2011 | Baba |
| 2012/0188123 A1 | 7/2012 | Baba et al. |
| 2013/0052944 A1 | 2/2013 | Baba et al. |
| 2014/0226446 A1 | 8/2014 | Kato et al. |
| 2014/0247701 A1 | 9/2014 | Honda et al. |
| 2015/0003212 A1* | 1/2015 | Imamura ................ G04R 20/02 368/47 |
| 2015/0257114 A1* | 9/2015 | Sawada ............. H04W 52/0241 370/350 |

FOREIGN PATENT DOCUMENTS

| | | |
|---|---|---|
| JP | 2011043449 A | 3/2011 |
| JP | 2012093281 A | 5/2012 |

* cited by examiner

| ACQUIRING START SECOND | ACQUIRING UPPER LIMIT TIME(sec) | MAXIMUM POWER CONSUMPTION AMOUNT(mA·s) | RECEPTION TIME(sec) |
|---|---|---|---|
| 0 | 12 | 144.0 | 36,42 |
| 1 | 11 | 139.5 | 35,41 |
| 2 | 10 | 135.0 | 34,40 |
| 3 | 9 | 130.5 | 33,39 |
| 4 | 11 | 148.5 | 32,38,44 |
| 5 | 13 | 148.5 | 31,37,43 |
| 6 | 15 | 148.5 | 36,42 |
| 7 | 17 | 148.5 | 35,41 |
| 8 | 19 | 148.5 | 34,40 |
| 9 | 21 | 148.5 | 33,39 |
| 10 | 20 | 144.0 | 32,38 |
| 11 | 19 | 139.5 | 31,37 |
| 12 | 18 | 135.0 | 36 |
| 13 | 17 | 130.5 | 35 |
| 14 | 16 | 126.0 | 34 |
| 15 | 15 | 121.5 | 33 |
| 16 | 14 | 117.0 | 32 |
| 17 | 13 | 112.5 | 31 |
| 18 | 12 | 108.0 | 30 |
| 19 | 11 | 103.5 | 29 |
| 20 | 10 | 99.0 | 28 |
| 21 | 9 | 94.5 | 27 |
| 22 | 11 | 148.5 | 26,44 |
| 23 | 13 | 148.5 | 25,43 |
| 24 | 12 | 144.0 | 24,42 |
| 25 | 11 | 139.5 | 23,41 |
| 26 | 10 | 135.0 | 22,40 |
| 27 | 9 | 130.5 | 21,39 |
| 28 | 11 | 148.5 | 20,38,44 |
| 29 | 13 | 148.5 | 19,37,43 |

| ELAPSED TIME | ACQUIRING UPPER LIMIT TIME(SEC) | ACQUIRING START SECOND |
|---|---|---|
| 24 DAYS OR MORE | 9 | ARBITRARY |
| 12 DAYS OR MORE, LESS THAN 24 DAYS | 13 | 5 |
| 6 DAYS OR MORE, LESS THAN 12 DAYS | 17 | 7 |
| 2 DAYS OR MORE, LESS THAN 6 DAYS | 19 | 8 |
| LESS THAN 2 DAYS | 20 | 9 |

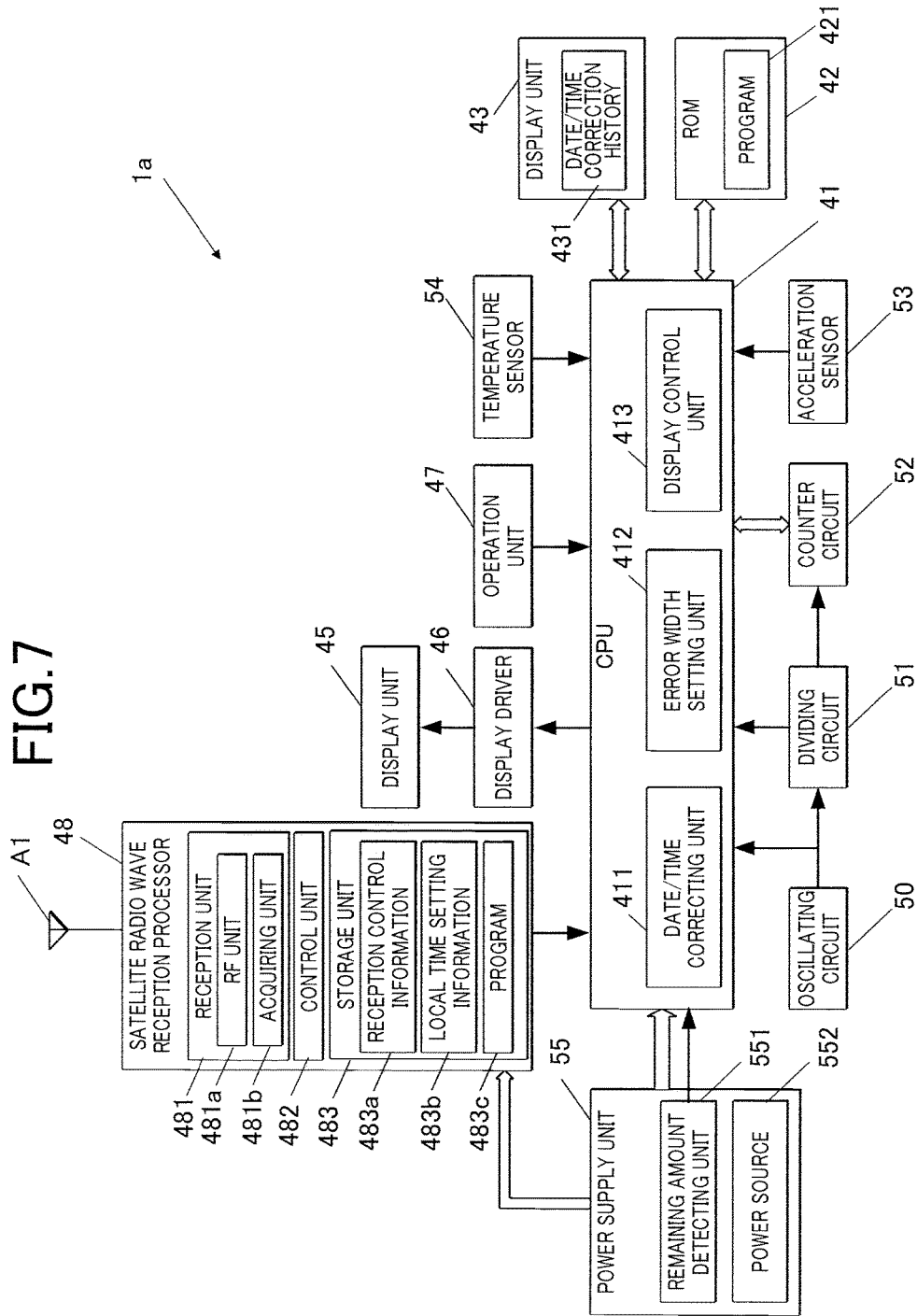

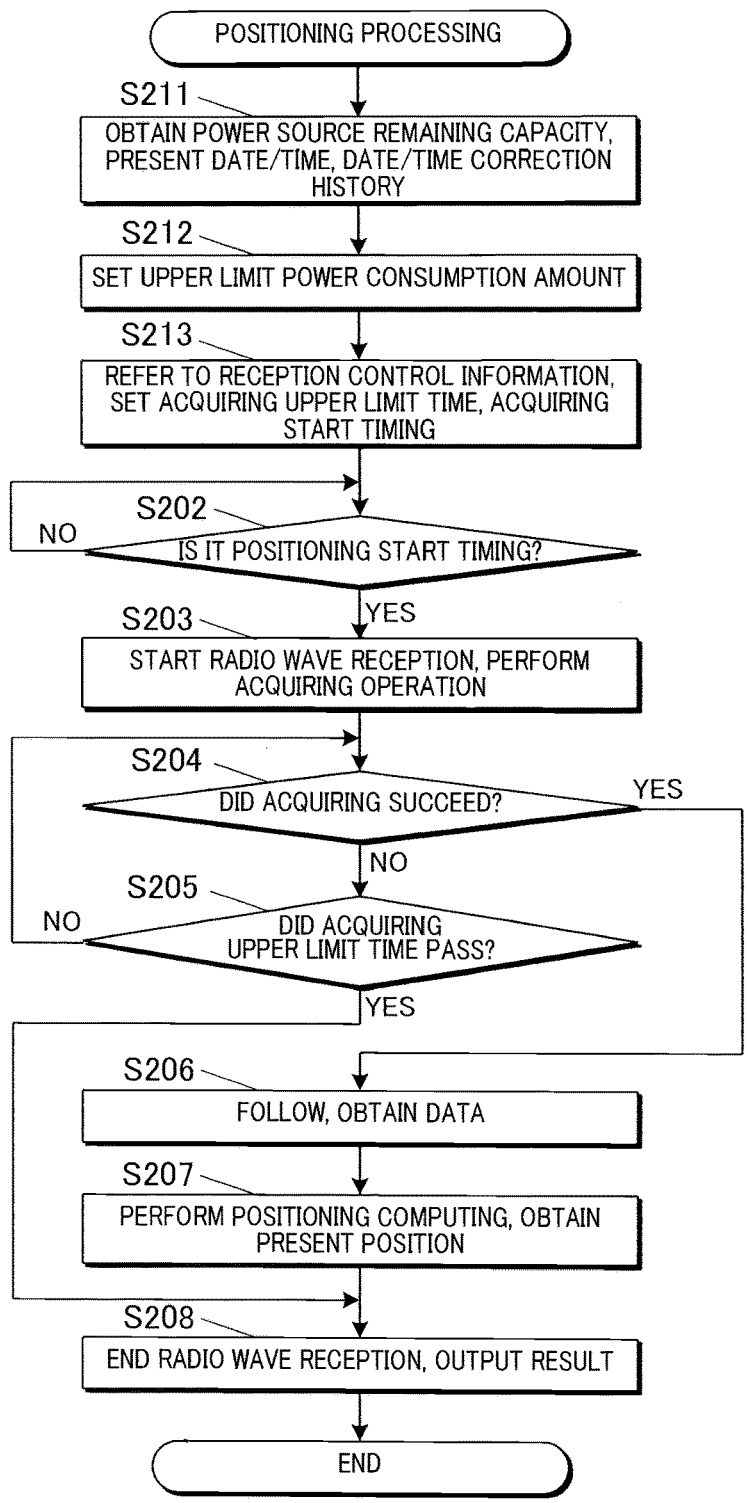

RADIO WAVE RECEIVER, RADIO-CONTROLLED TIMEPIECE, SIGNAL OBTAINING METHOD AND STORAGE MEDIUM

CROSS-REFERENCE TO RELATED APPLICATIONS

This is a Divisional of U.S. Ser. No. 15/002,190, filed Jan. 20, 2016, which is based upon and claims the benefit of priority from prior Japanese patent application No. 2015-054919, filed Mar. 18, 2015, the entire contents of both of which are incorporated herein by reference.

BACKGROUND OF THE INVENTION

Field of the Invention

The present invention relates to a radio wave receiver which receives satellite radio waves, a radio-controlled timepiece, a signal obtaining method and a storage medium.

Description of the Related Art

Conventionally, there is a positioning apparatus which receives radio waves from a plurality of positioning satellites of a global navigation system such as a GPS (Global Positioning System) and obtains the present position based on signals (navigation message) included in the radio waves. Such positioning apparatus is able to obtain the accurate present position on the entire globe where satellite radio waves can be received. Therefore, the positioning device is used for various purposes such as navigation and recording of history of the movement of the user, notification of the present position, and distribution of advertisement according to the present position.

Among electronic timepieces (radio-controlled timepieces) which receive a radio wave including date/time information and correct the date/time, some are able to receive the radio wave from the positioning satellite. Among such radio-controlled timepieces, some perform positioning to select local time information, in other words, information regarding time zone or rules for summer time according to the present position. With this, suitable local time can be computed and displayed.

The load of receiving the radio wave from the positioning satellite is very large compared to the load of normal operation of counting and displaying the date and time. This consumes the conventional power source used in the radio-controlled timepiece within a short period of time. Alternatively, if a power source for a high load is used, this leads to the problem of increase in size and weight of the radio-controlled timepiece. Therefore, in timepieces which receive radio waves from the positioning satellite, especially, those which are portable such as a watch, there is a technique to not start reception or to pause reception until directly before the timing that the necessary information is transmitted so that the reception operation time can be shortened.

However, in order to obtain the information necessary from the positioning satellite, the signal included in the radio wave needs to be acquired in advance. The time necessary to acquire the signal depends on the environment when the radio wave is received. Therefore, if the acquiring upper limit time is set too short, the radio wave cannot be acquired and the necessary information cannot be obtained. Alternatively, if the upper limit time is set too long, this leads to increase in power consumption. In view of the above, Japanese Patent Application Laid-Open Publication No. 2012-93281 discloses a technique to change the setting of the acquiring upper limit time according to the frequency of occurrence that the necessary information is transmitted.

However, when a radio wave transmitted from a positioning satellite is received to obtain information necessary for positioning, the amount of time until the necessary information is obtained changes depending on the timing that the acquiring operation ends. In other words, the relation between the acquiring time and the power consumption is not simple, and if the acquiring operation is set uniformly, problems as follows may increase, for example, the power consumption may become large even if the acquiring time is not so long, or the acquiring may be considered to fail even if there is plenty of power left and the information necessary for positioning cannot be obtained.

SUMMARY OF THE INVENTION

The purpose of the present invention is to provide a radio wave receiver, a radio-controlled timepiece, a signal obtaining method and a storage medium in which information necessary for positioning can be reliably obtained while avoiding a large amount of power consumption.

According to an aspect of the present invention, there is provided a radio wave receiver including:

a radio wave reception processor which receives radio waves and obtains signals transmitted from positioning satellites from the received radio waves; and a processor which sets reception start timing of the radio waves by the radio wave reception processor and controls the radio wave reception processor to start reception, wherein, the radio wave reception processor performs an acquiring operation to acquire transmission signals from a number of positioning satellites necessary for computing a present position from the received radio waves, and after the acquiring operation, the radio wave reception processor performs obtaining operation to obtain signals necessary for computing the present position from the acquired transmission signals in an obtaining time from an obtaining start timing to an obtaining end timing determined depending on a format according to the positioning satellites; and the processor sets the reception start timing so that following reception conditions are satisfied, (i) a total power consumption amount of a power amount according to the obtaining operation and the obtaining time and a power amount according to an acquiring upper limit time from start timing of the acquiring operation by the radio wave reception processor to the obtaining start timing and the acquiring operation is equal to or less than a predetermined upper limit power consumption amount and (ii) the acquiring upper limit time is equal to or more than a predetermined reference time.

BRIEF DESCRIPTION OF THE DRAWINGS

The present invention and the above-described objects, features and advantages thereof will become more fully understood from the following detailed description with the accompanying drawings and wherein;

FIG. 7 is a block diagram showing a functional configuration of an electronic timepiece of a second embodiment; and FIG. 8 is a flowchart showing a control process of positioning processing performed in the electronic timepiece of the second embodiment.

DETAILED DESCRIPTION OF THE PREFERRED EMBODIMENTS

Below, an embodiment of the present invention is described with reference to the drawings.

First Embodiment

Figure 1:
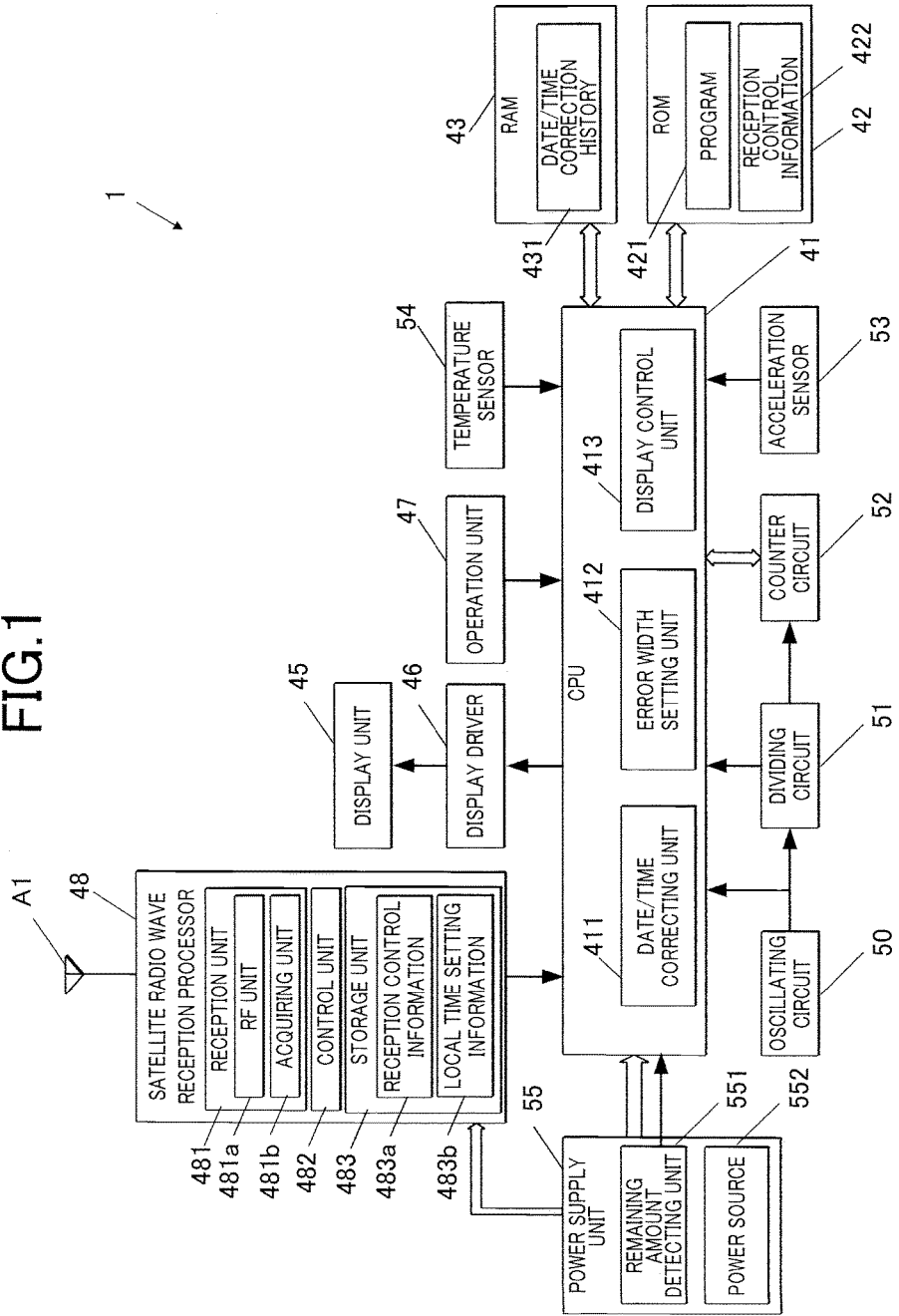
FIG. 1 is a block diagram showing a functional configuration of an electronic timepiece of a first embodiment.

FIG. 1 is a block diagram showing a functional configuration of an electronic timepiece 1 of the first embodiment.

The electronic timepiece 1 of the first embodiment is a portable radio-controlled timepiece which can receive a satellite radio wave, for example, an electronic watch.

The electronic timepiece 1 includes a CPU (Central Processor) 41 (processor, date/time correcting unit 411, error width setting unit 412, display control unit 413), a ROM (Read Only Memory) 42, a RAM (Random Access Memory) 43, a display unit 45 (display unit) and a display driver 46, an operation unit 47, an oscillating circuit 50, a dividing circuit 51, a counter circuit 52 (counter unit, timepiece counter unit), a satellite radio wave reception processor 48 and antenna A1, an acceleration sensor 53, a temperature sensor 54, a power supply 55, and the like.

The CPU 41 performs various arithmetic processing and centrally controls the entire process of the electronic timepiece 1. The CPU 41 transmits a signal to the counter circuit 52 based on date/time data obtained from a satellite radio wave reception processor 48, and corrects the date/time data held by the counter circuit 52. The CPU 41 obtains the present position, time zone and the setting of summer time rules from the satellite radio wave reception processor 48 and performs display of the local time. The CPU 41 includes a date/time correcting unit 411, a error width setting unit 412, and a display control unit 413. Such date/time correcting unit 411, error width setting unit 412, and display control unit 413 can be included in a single CPU or a separate CPU can be provided for each unit to perform the operations.

The ROM 42 stores various programs and initial setting data so that the electronic timepiece 1 performs various operations. A program 421 used to control reception of the satellite radio wave regarding correction of the date/time and local time setting is included in the program stored in the ROM 42. Reception control information 422 is included in the initial setting data. The reception control information 422 includes information to determine the suitable reception start timing, the acquiring upper limit time of the satellite radio wave and timeout time.

The RAM 43 provides a memory space for the operation by the CPU 41, and stores various pieces of temporary data, rewritable setting data, and status data. The data stored in the RAM 43 is included in the date/time correction history 431. The latest date/time when the date/time correction is performed is stored in the date/time correction history 431. Here, the timing that the correction is performed is stored based on the date/time information obtained alone or together with the positioning processing in the satellite radio wave reception processor 48.

The display unit 45 includes a display screen and displays various information such as date/time information according to a driving signal from the display driver 46. Although not limited, a segment type liquid crystal display (LCD) is used as the display screen, and is able to display the alphabet and predetermined specific indicators showing numerals, AM/PM, day of week, etc.

The operation unit 47 includes a plurality of operation keys and press buttons. When these operation keys and press buttons are operated, the operation is converted to an electric signal and output to the CPU 41 as an input signal. The operation unit 47 is able to include a winding crow or touch sensor instead of or in addition to the operation keys and press buttons.

The satellite radio wave reception processor 48 is a module which receives a radio wave transmitted from the positioning satellite regarding the positioning system such as a GPS (Global Positioning System) using the antenna A1, acquires, demodulates, and decodes a signal (navigation message) from the radio wave to decipher and output date/time information and position information. The satellite radio wave reception processor 48 operates by receiving power supply separately from other units only when reception operation is performed according to a control signal from the CPU 41.

The satellite radio wave reception processor 48 includes a reception unit 481, a control unit 482 (obtaining unit, present position computing unit, local time information obtaining unit, and local time obtaining unit), and storage unit 483. The reception unit 481 includes a RF unit 481a (radio wave reception unit) which performs processing preceding reception of the radio wave such as tuning and amplification to the reception radio wave, extracting the signal of the predetermined frequency band, and converting to the intermediate frequency band, and an acquiring unit 481b which acquires the transmission signal from the positioning satellite. The control unit 482 includes a CPU and a RAM, and in addition to controlling the operation of the satellite radio wave reception processor 48, performs obtaining operation of the signal such as following and demodulating the acquired satellite radio wave, and processing such as computing the present position based on decoding, deciphering of the navigation messages and the deciphered navigation messages. The control unit 482 refers to the local time setting information 483b in the storage unit 483 to obtain the local time information such as the time zone and the summertime rules according to the computed present position, and computes the local time in the present position. The reception processing from the following to the computing of the present position can be controlled by a plurality of CPU's different from the CPU controlling the entire processing of the satellite radio wave reception processor 48 and the processing regarding the setting of the local time.

The satellite radio wave reception processor 48 includes a RTC (Real Time Clock, not shown). When the satellite radio wave reception processor 48 operates, the date/time counted by the RTC and the date/time obtained from the CPU 41 are referred so that the control unit 482 counts the present date/time.

The storage unit 483 includes a nonvolatile memory such as a flash memory, and stores various setting information regarding the processing based on the reception of the satellite radio wave and the information obtained by the reception. Such setting information include reception control information 483*a* and local time setting information 483*b*. The reception control information 483*a* includes setting information such as reception start timing and acquiring upper limit time obtained from the CPU 41. The local time setting information 483*b* includes a list of map information and the summer time rules to obtain the local time setting according to the computed present position. Among the above, the reception control information 483*a* may be only temporarily stored in the RAM of the control unit 482 while positioning processing is performed, and may not be held in the storage unit 483.

The oscillating circuit 50 outputs an oscillating signal at a predetermined frequency such as 32.768 kHz. The oscillating circuit 50 is not limited to but may include a crystal oscillator which is small and low in cost, and offers low power consumption.

The dividing circuit 51 divides the oscillating signal, generates the signal with the necessary frequency, and outputs the signal. According to a control signal from the CPU 41, the dividing circuit 51 is able to suitably switch the dividing ratio and output the signal with a different frequency.

The counter circuit 52 adds the elapsed time obtained based on the predetermined frequency signal input from the dividing circuit 51 to the set time/date obtained from the RTC (Real Time Clock, not shown) to count the present date/time. The present date/time counted by the counter circuit 52 is rewritten and corrected by the control signal from the CPU 41 based on the date/time data obtained from the GPS satellite.

For example, the acceleration sensor 53 is provided positioned parallel to the display screen of the display unit 45. The acceleration sensor 53 measures triaxial acceleration in the display surface of the electronic timepiece 1 and in the vertical direction of the display surface, and uses the above to obtain the movement state in a watch or portable timepiece. For example, a MEMS sensor using a piezoelectric element is used as the acceleration sensor 53. An electric signal (voltage signal, current signal) according to the force applied to the piezoelectric element depending on the acceleration is output, the signal is digitally sampled in an ADC (analog/digital converter, not shown), and the signal is input to the CPU 41.

The temperature sensor 54 measures the internal temperature of the electronic timepiece 1. The measured temperature changes according to a temperature of a chip internally provided with the CPU 41 and the RAM 43, and outputs to the CPU 41 the measured temperature as the electric signal. Although not limited, the temperature sensor 54 is formed using a thermistor, and is formed as an IC chip independently or collectively with the CPU 41, etc.

The power supply 55 supplies power necessary for operation to each unit of the electronic timepiece 1 such as the CPU 41 or the satellite radio wave reception processor 48. For example, the power supply 55 includes a power source 552 such as a button type primary battery provided to be detachable for exchange. Preferably, the power source 552 is small and light-weight so as to be usable continuously and stably for a long period of time under use of low power consumption. Therefore, preferably, operation of the satellite radio wave reception processor 48 which consumes an extremely large amount of power in the electronic timepiece 1 is performed within a short period of time and with a sufficient interval in between operations. The power supply 55 is provided with a remaining amount detecting unit 551 (remainder obtaining unit). The remaining capacity (remainder power amount) of the power source 552 is measured, and the signal showing the measured value or one of the plurality of steps determined according to the measured value is output to the CPU 41.

Among the above, the satellite radio wave receiver is configured with the CPU 41, the ROM 42, and the satellite radio wave reception processor 48.

Next, the navigation message received from the GPS satellite is described.

The navigation message transmitted from the positioning satellite is an array of codes according to a predetermined format. The navigation message transmitted from the positioning satellite of the GPS (GPS satellite) consists of a total of 25 pages of frame data and the amount of time to transmit each page is 30 seconds. Each frame (page) includes 5 pieces of sub-frame data (6 seconds, 1500 bits each), and each piece of sub-frame data consists of 10 WORD (0.6 seconds, 300 bits each). Therefore, the navigation message is transmitted at a cycle of 12.5 minutes. The data transmission of each page starts at 0 seconds and 30 seconds of each minute in an atomic clock included in the GPS satellite (GPS clock).

All GPS satellites transmit radio waves at the same frequency, and the radio waves are received with a time difference according to the distance between the present position and the GPS satellite. Such radio waves are transmitted with phase modulation (spread spectrum) on the signal including the navigation message in a pseudo random code (C/A code) specific to each GPS satellite. In the satellite radio wave acquiring operation, the C/A code corresponding to the plurality of GPS satellites is copied and correlated with the phases of the signal of the reception radio wave using a correlator (sliding correlator) to discriminate in parallel the GPS satellite corresponding to the received radio wave among the plurality of GPS satellites and the phase. The acquiring operation can be performed by software using the CPU and the DRAM under control of the control unit 482.

All of the WORD1 of the sub-frame include TLM (telemetry word) and the top position of the sub-frame is identified by the fixed code string (Preamble) included in the top of the TLM. WORD2 includes HOW (hand over word) and sub-frame ID. HOW shows the elapsed time within the week from 0 hours on Sunday. The sub-frame ID shows which sub-frame within the page the read data is. Therefore, the Preamble of the sub-frame is identified, the position of HOW is specified by the relative time from the Preamble, and the elapsed time within the week is obtained.

In addition to the above, from the WORD3 of the sub-frame and after, information unique to the sub-frame is included. Sub-frame 1 includes WN showing week number, and correction information of the time of transmission. Sub-frames 2 and 3 include ephemeris data which is orbital information of the GPS satellite which is the source of transmission of the navigation message. A portion of sub-frame 4 and sub-frame 5 sequentially transmit almanac data of the predicted orbit of all GPS satellites divided to each page. Positioning requires the positions of at least 4 positioning satellites and the difference of the distance from the 4 positioning satellites to the present position (pseudo distance). In other words, information regarding the satellite position, pseudo distance and date/time necessary for positioning are included in the sub-frames 1 to 3. Therefore, it is enough to receive and obtain data of 3 sub-frames from the top of the sub-frame 1. Therefore, when data is obtained from the GPS satellite in a unit of sub-frames based on the format of the navigation message according to the GPS satellite, if the top of the sub-frame 1 is considered to be the timing of the start of obtaining data, data to the end of the sub-frame 3 is obtained (timing of the end of obtaining data) is obtained in 18 seconds (amount of time to obtain data). When the top of the sub-frame 2 is considered to be the timing of the start of obtaining data, the data to the end of the sub-frame 1 is obtained in 30 seconds. When the top of the sub-frame 3 is considered to be the timing of the start of obtaining data, the data to the end of the sub-frame 2 is obtained in 30 seconds.

Next, the operation to receive the satellite radio wave in the electronic timepiece 1 of the present embodiment is described.

In the electronic timepiece 1 of the present embodiment, power is supplied to the satellite radio wave reception processor 48 according to control of the CPU 41, the satellite radio wave reception processor 48 is started and information regarding the data of the target to be obtained and various setting data are transmitted from the CPU 41 to the satellite radio wave reception processor 48. With this, the processing of the satellite radio wave reception processor 48 is started. Processing performed by the satellite radio wave reception processor 48 include, in addition to positioning processing, processing to obtain only the date/time information, processing to update and set the local time setting information 483b without receiving the radio wave, and the like. The positioning processing may include referring to the local time setting information 483b based on the obtained present position to identify the time zone and the summer time rule of the present position and outputting the above with the local time.

Figure 2:
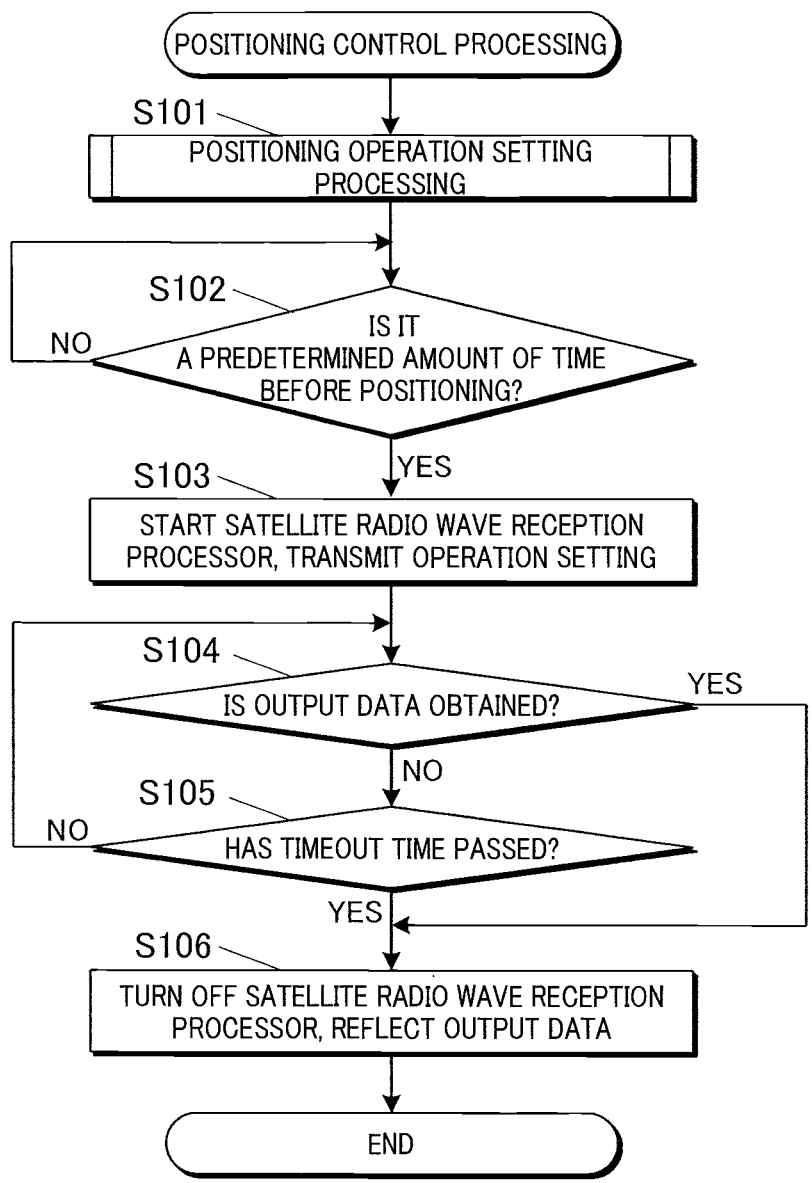
FIG. 2 is a flowchart showing a control process of positioning control processing performed in the electronic timepiece of the first embodiment.

FIG. 2 is a flowchart showing the control process by the CPU 41 in the positioning control processing performed in the electronic timepiece 1 of the present embodiment.

The positioning control processing starts when the CPU 41 obtains by manual operation or automatically a command to perform positioning using the satellite radio wave reception processor 48 or a command that the positioning is necessary.

When the positioning control processing is started, the CPU 41 starts and performs the positioning operation setting processing (step S101). In the positioning operation setting processing, the start timing of the operation and the timeout time are set. The CPU 41 determines whether it is a predetermined amount of time before the set positioning start timing (start timing of reception of satellite radio waves) (step S102), and when it is determined that it is not yet the predetermined amount of time before (step S102, "NO"), the processing of step S102 is repeated. The predetermined amount of time needs to be equal to or more than the total of the amount of time necessary to supply power to the satellite radio wave reception processor 48 to start the operation of the control unit 482 and the amount of time from the positioning start timing to the later described acquiring start timing.

When it is determined that it is a predetermined amount of time before the positioning start timing (step S102, "YES"), the CPU 41 starts the satellite radio wave reception processor 48 and transmits a positioning command and the positioning operation setting to the satellite radio wave reception processor 48 (step S103).

The CPU 41 determines whether output data regarding the positioning result is obtained from the satellite radio wave reception processor 48 (step S104). When it is determined that the output data is not obtained (step S104, "NO"), the CPU 41 determines whether the timeout time elapsed from the start of the satellite radio wave reception processor 48 (step S105). When it is determined that the timeout time has not yet elapsed (step S105, "NO"), the processing of the CPU 41 returns to step S104. When it is determined that the timeout time elapsed (step S105, "YES"), the processing of the CPU 41 advances to step S106.

In the determination processing of step S104, when it is determined that the output data is obtained from the satellite radio wave reception processor 48 (step S104, "YES"), the processing of the CPU 41 advances to step S106.

When the processing advances from the determination processing of step S104 and step S105 to step S106, the CPU 41 stops the operation of the satellite radio wave reception processor 48 and reflects the obtained output data in the processing (step S106). The CPU 41 obtains positioning data and data set in the satellite radio wave reception processor 48 based on the positioning data, such as time zone or summer time rules. The CPU 41 displays the positioning result on the display unit 45, and reflects the obtained time zone and summer time rules on the local time setting information 483b. Alternatively, the CPU 41 may simply store the obtained latitude/longitude of the present position with the date/time information in the RAM 43, and hold the above as history of the movement of the user. Further, the CPU 41 may output the control signal to the display driver 46 to display on the display unit 45 the latitude/longitude or the city name/region name according to the latitude/longitude together or alternately with the present date/time. Then, the CPU 41 ends the positioning control processing.

Figure 3:
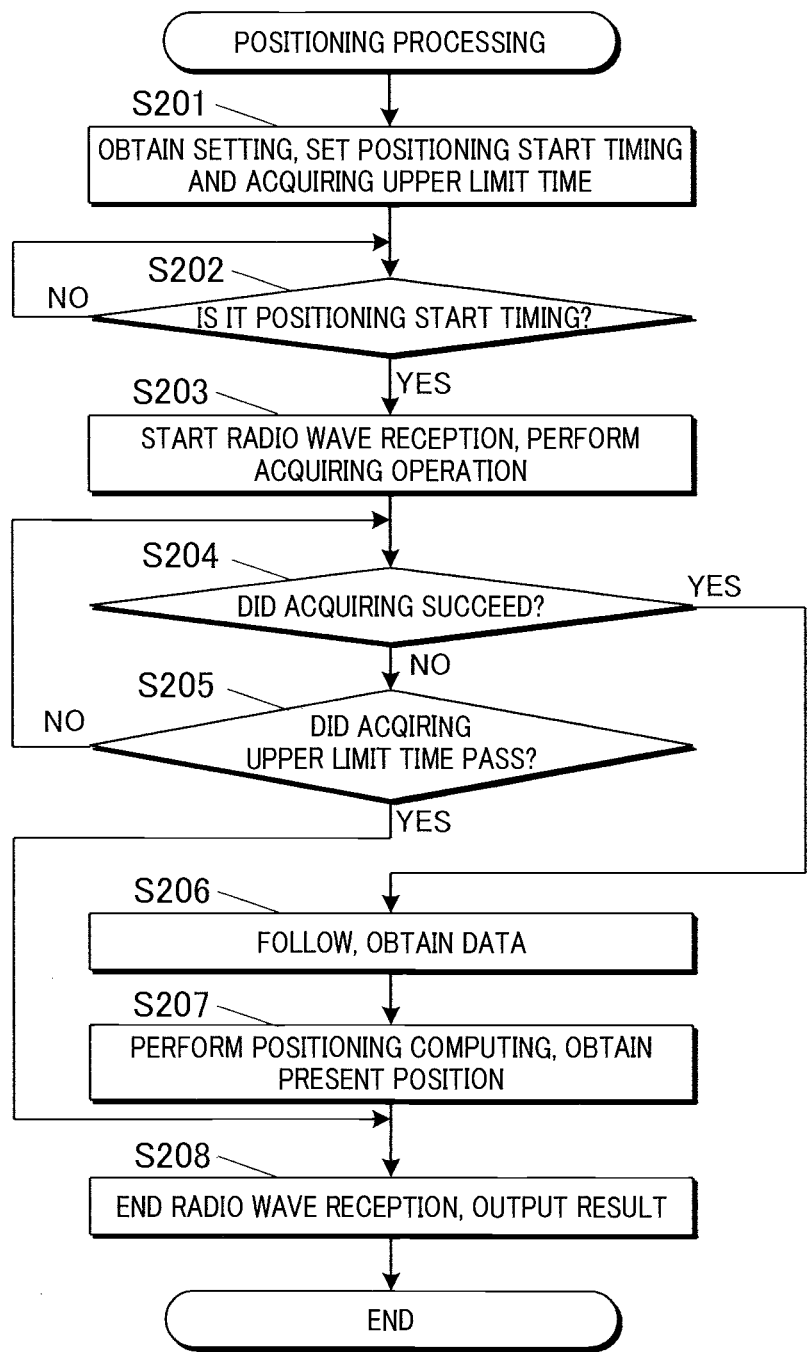
FIG. 3 is a flowchart showing a control process of positioning processing performed in the electronic timepiece of the first embodiment.

FIG. 3 is a flowchart showing a control process by the control unit 482 in the positioning processing performed in the satellite radio wave reception processor 48.

The positioning processing starts when the CPU 41 starts the satellite radio wave reception processor 48 and the command to perform the positioning operation is obtained.

The control unit 482 (CPU of the control unit 482) obtains the positioning operation setting input from the CPU 41 and performs setting of the positioning start timing and the acquiring upper limit time (step S201). Here, the positioning start timing is set a predetermined amount of time before the acquiring start timing which is when the acquiring unit 481b starts the acquiring operation. The predetermined amount of time is the amount of time necessary for initial starting operation of the reception of the radio wave, and is usually set to a fixed value (for example, 2 seconds) unique to the electronic timepiece 1. The control unit 482 determines whether it is the positioning start timing (step S202). When it is determined that it is not the positioning start timing (step S202, "NO"), the control unit 482 repeats the processing of step S202.

When it is determined to be the positioning start timing (step S202, "YES"), the control unit 482 starts the reception of the radio wave and performs the acquiring operation (step S203).

The control unit 482 determines whether the transmission signals are acquired from the necessary number of positioning satellites (step S204). When it is determined that it is not acquired (step S204, "NO"), the control unit 482 determines whether the elapsed time from the start of the acquiring operation passed the acquiring upper limit time (step S205). When it is determined that the acquiring upper limit time has not passed (it is less than the acquiring upper limit time) (step S205, "NO"), the processing of the control unit 482 returns to step S204. When it is determined that the acquiring upper limit time passed (it is equal to or more than the acquiring upper limit time) (step S205, "YES"), the processing of the control unit 482 advances to step S208.

In the judgment processing of step S204, when it is judged that the radio wave signals are acquired from the necessary number of positioning satellites (step S204, "YES"), the control unit 482 starts the following operation which matches the phase to the C/A code of the acquired transmission signal of the positioning satellite to continuously obtain the above and obtains the reception data (step S206). The control unit 482 performs spectrum inverse spreading on the navigation message with the acquired C/A code according to the positioning satellite to obtain the above.

The control unit 482 sequentially decodes, deciphers, and obtains the signals of the sub-frames 1 to 3 from the necessary number of positioning satellites and identifies the present date/time obtained from the GPS satellite with the satellite position. The positioning computation is performed based on the identified information and the present position is obtained (step S207). Here, the control unit 482 is able to select and set the local time setting information (time zone and summer time rules) according to the present position from the local time setting information 483b. Further, the present date/time (here, the UTC date/time) obtained with the present position can be converted to the local time of the selected region. Then, the processing of the control unit 482 advances to step S208.

When the processing advances from step S205 and step S207 to step S208, the control unit 482 ends the reception of the radio wave and outputs to the CPU 41 the related setting data according to the request from the positioning result and the CPU 41 (step S208). Then, the control unit 482 ends the positioning processing.

As described above, in the reception of the radio wave from the GPS satellite regarding the positioning, the data reception time (obtaining time) becomes shortest when the data of the sub-frames 1 to 3 are received in 18 seconds. Alternatively, when the data reception starts soon after the data of the sub-frame 1 is transmitted, slightly less than 36 seconds is necessary to receive the data at the end of the sub-frame 1 in the next frame cycle. In other words, the time to receive the data necessary for positioning is different depending on the time that the data reception starts.

In the radio wave reception from the GPS satellite, it is necessary to acquire the transmission signal from the number of GPS satellites necessary for positioning (usually four satellites) before data reception. In a position of an open area where the radio wave can be received from the GPS satellite with the small angle of elevation, the transmission signals can be acquired quickly from the necessary number of GPS satellites within a short amount of time (for example, less than 1 second), but in a mountainous area or in the city where there are many tall buildings, more time is usually necessary to acquire the transmission signals from the necessary number of GPS satellites. In the portable electronic timepiece such as the electronic watch, the reception environment drastically changes by the movement of the user, and therefore, it is often difficult to estimate the acquiring time in advance. As a result, a short acquiring time is set to reduce the power consumption, and when the data reception timing of the top position of the sub-frame 1 passes before the acquiring operation ends, especially when the data reception to the end of the next sub-frame 1 after the sub-frames 4 and 5 is necessary, the amount of time until the end of reception becomes very long.

In the electronic timepiece 1 of the present embodiment, the upper limit of the power consumption amount (upper limit power consumption amount) is set in advance, and the acquiring start timing (and/or the positioning start timing before the fixed time as described above) and the acquiring upper limit time are determined according to a reception condition which is to make the time necessary for the acquiring operation as long as possible (equal to or more than a predetermined reference time) within the range of the upper limit power consumption amount.

The radio wave transmitted from the GPS satellite is transmitted with the phase modulated on the signal with the same frequency at a pseudo random code (C/A code) of 1023 kHz set unique to the GPS satellite. In the acquiring operation of the transmission signal including the radio wave from the positioning satellite, the C/A codes corresponding to the plurality of GPS satellites are duplicated and correlated with the signal regarding the reception radio wave to perform the acquiring operation in parallel with the plurality of GPS satellites. Therefore, the power consumption tends to become large compared to the obtaining operation (following operation) of deciphering and obtaining necessary information by receiving the radio wave from the GPS satellite obtained in advance. When the acquiring operation ends earlier than the set acquiring upper limit time, the increase of the power consumption amount regarding the following operation (in other words, the amount of power according to the obtaining operation and the obtaining time) is smaller than the reduction of power consumption amount regarding the acquiring operation (in other words, the amount of power according to the acquiring operation and the acquiring upper limit time from the acquiring operation start timing to the obtaining operation start timing). Therefore, the total amount of power consumption can be reduced.

The upper limit power consumption amount can be a fixed value or can be a variable which changes according to conditions. For example, in the electronic timepiece 1 of the present embodiment, when the remaining capacity of the power source 552 detected by the remaining amount detecting unit 551 becomes small, the upper limit power consumption amount can be reduced. The variable setting can be directly set with an equation for the value of the remaining capacity, or can be set according to a plurality of steps set by comparing the remaining capacity of the power source 552 and a reference boundary value, for example, high level "H", middle level "M", and low level "L".

In order to determine the acquiring start timing, the present date/time needs to be accurately held. There is an error (error amount) of about a maximum of 0.5 seconds per day (unit time) when counting date and time with a oscillating circuit 50 including a typically used crystal oscillator and a dividing circuit 51. With such error, the error width of the date/time counted by the counter circuit 52 may be greatly different from the accurate date/time depending on the elapsed time from the latest date/time correction. Such error changes depending on various conditions such as temperature of the oscillating circuit 50 and cannot be a fixed value. Therefore, in the electronic timepiece 1, the acquiring start timing and the acquiring upper limit time are determined so that the power consumption is the upper limit power consumption amount or less regardless of the error amount within the expectable error width. When the transmission signals of the necessary number of GPS satellites cannot be acquired within the set acquiring upper limit time, the reception of the radio waves ends at this point.

As described above, the oscillating frequency of the crystal oscillator changes according to conditions such as the temperature. Therefore, by obtaining the temperature data of the temperature sensor 54 at a predetermined time interval and adding the error amount estimated according to the temperature at a number of times according to the elapsed time, it is possible to accurately estimate the error amount and the error width. In this case, the estimated error amount and the error width can be stored in the date/time correction history 431, and this can be updated each time the temperature data is obtained.

Figure 4:
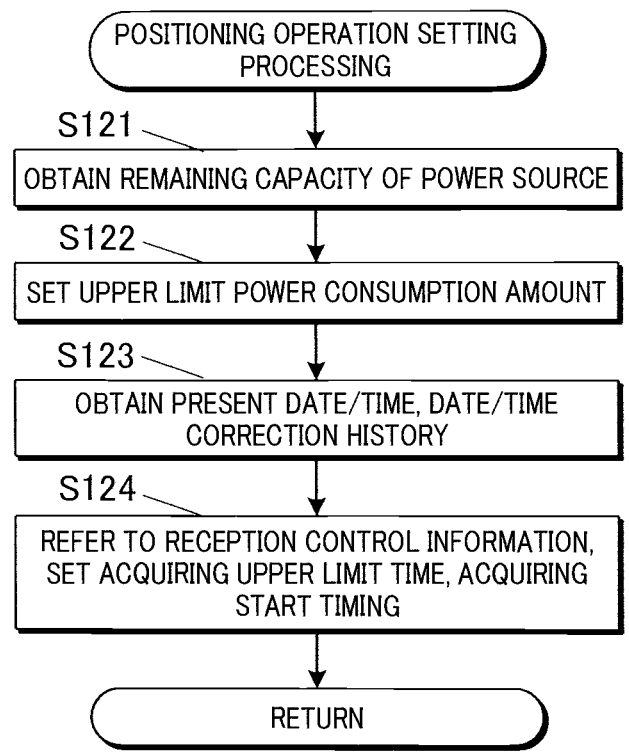
FIG. 4 is a flowchart showing a control process of positioning operation setting processing called in the positioning control processing.

FIG. 4 is a flowchart showing a control process by the CPU 41 in the positioning operation setting processing called in the positioning control processing.

When the positioning operation setting processing is called, the CPU 41 obtains the remaining capacity of the power source 552 measured by the remaining amount detecting unit 551 (step S121). The CPU 41 sets the upper limit power consumption amount in the present reception according to the remaining capacity of the power source 552 (step S122).

Next, the CPU 41 obtains the present date/time of the counter circuit 52 and the contents of the date/time correction history 431 (step S123). The CPU 41 computes the elapsed time (number of days) from the previous date/time correction according to the obtained latest date/time correction date/time and present date/time. The CPU 41 refers to the reception control information 422, and determines the acquiring upper limit time and the start timing of the acquiring operation according to the set upper limit power consumption amount and the elapsed time from the previous date/time correction (step S124). Then, the CPU 41 ends the positioning operation setting processing and returns the processing to the positioning control processing.

Instead of the start timing of the acquiring operation, the above-described positioning start timing can be determined.

Figures 5, 6:
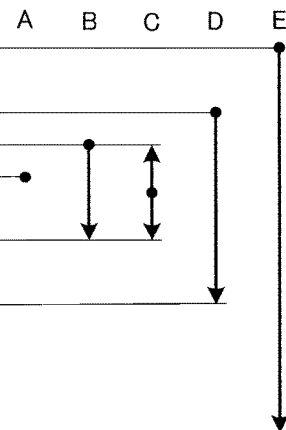
FIG. 5 is a diagram describing a setting example of a acquiring upper limit time and a acquiring start timing.
FIG. 6 is table data showing a relation between elapsed time from date/time correction and setting of acquiring operation.

FIG. 5 is a diagram to describe the example of setting the acquiring upper limit time and the acquiring start timing in the electronic timepiece 1 of the present embodiment.

Here, the consumed electric current in the acquiring operation is 4.5 mA, the consumed electric current in the following and data obtaining operation is 3.0 mA, and the error amount (pace) for each day of the date/time counted by the counter circuit 52 in one month is 0.5 seconds. The upper limit power consumption amount is 150 mA·sec. The acquiring start second here is the second of each minute in the GPS clock.

In this case, as shown in point (a), when the acquiring starts at 9 seconds, in other words, the acquiring operation starts from the position of WORD6 in the sub-frame 2, a maximum of 21 seconds can be secured for acquiring time until the top of the next sub-frame 1, and the maximum power consumption amount when the following and obtaining operation is performed for 18 seconds after the acquiring operation is performed for 21 seconds is 148.5 mA·sec, which is equal to or lower than the upper limit power consumption amount. When the acquiring operation is shorter than 21 seconds, the consumed electric current reduces 1.5 mA for each second, and when the acquiring operation ends 6 or more seconds faster, the reception time becomes shorter in the unit of 6 seconds (sub-frame unit).

When it is expected that there is an error in the date/time computed by the counter circuit 52, even when 9 seconds is set as the acquiring start timing, actually, the acquiring may not be started at 9 seconds according to the GPS clock, or may start before 9 seconds. For example, when the elapsed time from the latest date/time correction is less than 6 days, and the error is expected to be a value (error width) smaller than 3 seconds only to the minus side (delaying side), as shown in line (b), 8 seconds in each minute when the date/time counted by the counter circuit 52 is converted to the date/time of the GPS clock is to be the acquiring start timing, and the acquiring upper limit time is to be 19 seconds. With this, even if the accurate acquiring start second is different from 8 seconds, as long as it is within the error width (8 seconds and after, before 11 seconds), the maximum power consumption amount is always equal to or less than 150 mA·sec. When the error width is equally before or after less than ±1.5 seconds, the acquiring start second can be 9.5 seconds.

Similarly, in the electronic timepiece 1, as the expected error becomes larger, the acquiring upper limit time is reduced and the acquiring start second is set based on the term in which the minimum value of the acquiring upper limit time within the error width becomes largest. As shown in line (c), when the elapsed time is less than 12 days and the error is smaller than −6 seconds, the acquiring start time is 7 seconds and the acquiring upper limit time is 17 seconds. As shown in line (d), when the elapsed time is less than 24 days, and the error is smaller than −12 seconds, the acquiring start second is 5 seconds, and the acquiring upper limit time is 13 seconds.

In the case shown in FIG. 5, when the upper limit power consumption amount is 150 mA·sec, the acquiring upper limit time of 9 seconds can be set in all seconds. Therefore, when one month or more passed from the latest date/time correction and there is a possibility of a error of 15 seconds or more, by setting the acquiring upper limit time to 9 seconds, the positioning operation can be started and the acquiring operation can be performed at an arbitrary timing, in other words, right away.

The setting of the combination between the acquiring start second and the acquiring upper limit time can be stored in the storage unit 483 in advance as table data corresponded with the elapsed time from the latest date/time correction. Alternatively, similar table data can be made for different remaining capacity of the power source 552, and this can be stored in the storage unit 483. For different remaining capacity of the power source 552, the position itself of the suitable acquiring start second changes.

FIG. 6 is table data showing the elapsed time from the date/time correction corresponded with the setting of the acquiring operation.

As shown in FIG. 5, the acquiring upper limit time and the acquiring start second are corresponded to the elapsed time in 5 levels for the upper limit power consumption amount set in advance. The table data is stored in the reception control information 422, and the CPU 41 refers to the table data in the above described positioning operation setting processing. The CPU 41 obtains the acquiring upper limit time and the acquiring start timing suitable for the elapsed time to output the above to the satellite radio wave reception processor 48. Instead of storing the above separately in the ROM 42 as table data, the corresponding relation can be set and held in the program of the positioning operation setting processing. The acquiring upper limit time can be reliably set to a long amount of time by finely dividing the elapsed time. On the other hand, by considering the fine change of the power supplied from the power supply 55, the time for switching from the acquiring operation to the obtaining operation, etc., or when the final acquiring success rate does not increase much even if the acquiring operation time is extended, the value can be set to a value a little shorter (1 or 2 seconds) than the minimum value of the acquiring upper limit value in the error width.

Here, when the user is moving with the electronic timepiece 1 held, specifically, worn on the arm, more acquiring time may be necessary than normal since the axis direction of the electronic timepiece 1 is shaken or the relation with the position of buildings changes. In such case, when the acquiring upper limit time is set shorter than the predetermined reference value according to the remaining capacity of the power source 552, or the elapsed time from the latest date/time correction, the start of the radio wave reception can be paused. When the positioning is performed according to operation by the user and the start of the radio wave reception is paused, a display requesting to the user to maintain a stationary state can be displayed on the display unit 45.

As described above, the radio wave receiver which includes the electronic timepiece 1 of the present embodiment includes the RF unit 481*a* of the reception unit 481 which receives the radio waves, the CPU 41 (processor) which sets the start timing of reception of the radio waves by the RF unit 481*a* and starts reception, the acquiring unit 481*b* of the reception unit 481 which performs the acquiring operation to acquire the transmission signals from the number of positioning satellites necessary to compute the present position from the received radio waves, and a control unit 482 which, after the acquiring operation, functions as an obtaining unit to perform obtaining operation to obtain the signals necessary for computing the present position from the acquired transmission signals in the obtaining time from the obtaining start timing to the obtaining end timing which is set depending on a format according to the positioning satellite.

The CPU 41 sets a reception start timing which satisfies the following reception conditions, the power consumption amount which is a total of the power amount depending on the obtaining operation and the obtaining time, and the power amount according to the acquiring operation and the acquiring upper limit time from the start timing of the acquiring operation by the acquiring unit 481*b* to the obtaining start timing regarding the obtaining operation, is equal to or less than the upper limit power consumption amount set in advance, and the acquiring upper limit time is equal to or longer than a predetermined reference time.

In other words, the upper limit power consumption amount is set in advance and the acquiring operation is possible as long as possible within the above amount. Therefore, it is possible to raise the possibility of the acquiring of the transmission signals while reliably avoiding situations such as the acquiring operation being paused during the reception even when there is still allowance for further consumption of power and reception being needed to be performed again, or a uniform acquiring time setting causing no spare power due to the time necessary for obtaining operation becoming long in relation with the transmission timing of the navigation messages. Therefore, it is possible to avoid excess power consumption exceeding the suitably set upper limit power consumption amount while reliably obtaining the information necessary for positioning with one reception even when time is necessary for the acquiring operation.

The apparatus includes a counter circuit 52 which counts the present date/time, and the CPU 41 operates as the date/time correcting unit 411 which corrects the present date/time counted by the counter circuit 52 and the error width setting unit 412 which estimates the error of the present date/time counted by the counter circuit 52. Then, the CPU 41 sets the reception start timing satisfying the reception condition even if there is an error in the present date/time within the range of the error width, and starts the reception with the RF unit 481*a* based on the present date/time counted by the counter circuit 52.

As described above, even when the correction of the date/time in the counter circuit 52 is delayed and the accurate date/time is not computed, if the above is within the range of the error width, the reception start timing and the acquiring upper limit time is determined so that the power consumption amount does not exceed the upper limit power consumption amount. Therefore, it is possible to suitably determine the reception start timing and the acquiring upper limit time while preventing situations such as excessive power consumption and pausing during the reception of the radio wave due to error of the present date/time counted by the counter circuit 52.

As the reception condition, it is possible to set the acquiring upper limit time to be shorter as the error width becomes larger. Therefore, it is possible to set the acquiring upper limit time to a long amount as much as possible according to the error width without excessive power consumption.

The CPU 41 as the error width setting unit 412 estimates the error width of the present date/time based on the error amount (pace) for each unit time of the present date/time counted by the counter circuit 52 and the elapsed time from the previous correction of the present date/time. Therefore, it is possible to set the reception start timing and the acquiring upper limit time while easily and reliably considering the maximum error amount that normally may occur. Therefore, it is possible to prevent excessive power consumption and the reception of the radio wave pausing after the obtaining of the data starts.

The apparatus includes a remaining amount detecting unit 551 which obtains the remaining capacity of the power source 552 which supplies power to the RF unit 481*a*, etc., and the upper limit power consumption amount changes and is set according to the remaining capacity of the power source 552.

Therefore, the reception of the radio wave is not continued forcibly when there is no allowance in the remaining capacity of the power source 552, and the reception possible time can be set flexibly within the possible range.

The control unit 482 operates as the present position computing unit which computes the present position based on the obtained navigation messages. Therefore, the present position can be efficiently computed within the same configuration with the obtaining of the navigation messages. Since the present position can be computed and output with the same configuration, the product included in one package as the radio wave receiver can be mounted in the electronic device and the positioning result can be easily obtained by receiving the radio waves of the positioning satellites.

The control unit 482 operates as the local time information obtaining unit which obtains the local time information according to the computed present position, and the local time obtaining unit which obtains the local time according to the present date/time based on the obtained local time information. Therefore, the local time of the present position can be accurately obtained by using the obtained positioning data without excessive power consumption.

In addition to the configuration of the radio wave receiver as described above, the electronic timepiece 1 of the present embodiment is a radio-controlled timepiece including a display unit 45, and the CPU 41 functions as the display control unit 413 which displays the local time obtained by the local time obtaining unit on the display unit 45.

According to the above configuration in the radio-controlled timepiece, the local time can be easily obtained by one reception of the radio wave while avoiding excessive power consumption. Therefore, the capacity of the power source 552 of the radio-controlled timepiece does not have to be increased. Consequently, the size and the weight of the radio-controlled timepiece do not increase.

The CPU 41 as the display control unit 413 displays on the display unit 45 the present date/time and the information regarding the computed present position at the same time or selectively. With this, the electronic timepiece 1 can be used not only as simply a clock, but also as a position display device, a log recording device, and a navigation device. Therefore, in the electronic timepiece 1, the present position can be more reliably obtained and displayed by each reception without increasing the weight and the size more than necessary.

According to the method of obtaining the signal as described in the above embodiment, when the load which can be applied to the power source 552 is limited and the radio wave reception time and the reception interval needs to be suitably controlled, the reception time of each reception is controlled based on the power consumption amount, and power is not consumed excessively in one reception. The reception start timing and the acquiring upper limit time can be suitably set within the range of the power consumption amount. Therefore, the information necessary for positioning can be more reliably obtained within the possible range.

Second Embodiment

Next, the electronic timepiece 1a of the second embodiment is described.

FIG. 7 is a block diagram showing a functional configuration of the electronic timepiece 1a including the radio wave receiver of the second embodiment of the present invention.

In the electronic timepiece 1a of the second embodiment, the reception control information 422 is not included in the ROM 42, and the program 483c regarding the positioning processing of the present embodiment is included in the storage unit 483. Other than the above, the configuration is the same as the electronic timepiece 1 of the first embodiment. Moreover, the information the same as the reception control information 422 is stored in the reception control information 483a of the satellite radio wave reception processor 48. The same reference numerals are applied for the same configuration and the description is omitted.

FIG. 8 is a flowchart showing the control process by the control unit 482 in the positioning processing performed by the satellite radio wave reception processor 48 of the electronic timepiece 1a of the second embodiment.

In the positioning processing, the processing of step S201 in the positioning processing controlled by the positioning processing performed in the satellite radio wave reception processor 48 of the electronic timepiece 1 of the first embodiment is replaced by processing of steps S211 to S213. Other than the above, the processing is the same, and the same reference numerals are applied to the same processing and the description is omitted.

In the electronic timepiece 1a of the second embodiment, when the positioning command is output to the satellite radio wave reception processor 48 from the CPU 41, the information regarding the remaining capacity of the power source 552 and the date/time correction history is also input to the satellite radio wave reception processor 48. Here, the present date/time can be input together. Then, the acquiring upper limit time and the acquiring start timing are determined in the satellite radio wave reception processor 48, and the reception operation is performed at a suitable timing.

When the positioning processing starts, the control unit 482 of the satellite radio wave reception processor 48 obtains the input remaining capacity of the power source 552 and the present date/time and the date/time correcting history (step S211), and the present date/time is counted according to the obtained present date/time. The control unit 482 determines the upper limit power consumption amount based on the remaining capacity of the power source 552 (step S212). The control unit 482 computes the elapsed time from the previous date/time correction based on the present date/time and the date/time correction history, refers to the reception control information 483a, and obtains and sets the acquiring upper limit time and the acquiring start timing according to the determined upper limit power consumption amount and the computed elapsed time (step S213). Then, the processing of the control unit 482 advances to step S202.

As described above, in the electronic timepiece 1a of the second embodiment, instead of or in addition to the counter circuit 52, the control unit 482 of the satellite radio wave reception processor 48 functions as the counter unit. According to the electronic timepiece 1a of the second embodiment, once the reception control information 483a is set, after obtaining the parameter when the satellite radio wave reception processor 48 starts, all control is possible with the satellite radio wave reception processor 48 until the information necessary for positioning is obtained, and further until the positioning result is obtained. Therefore, by suitably designing the satellite radio wave reception processor 48 and performing the program 483c, it is possible to efficiently manage from the reception of the satellite radio wave to the obtaining of the positioning data. Therefore, it is possible to reduce the communication of data between the satellite radio wave reception processor 48 and other structures. Moreover, it is possible to form a suitable dedicated circuit in the satellite radio wave reception processor 48.

By installing the program 483c regarding the positioning processing of the present embodiment in a computer provided with the RF unit 481a which receives the satellite radio wave, it is possible to more reliably obtain the information necessary for positioning within a range of the power consumption amount suitable for the capacity of the power source 552 in various electronic timepieces.

The present invention is not limited to the above described embodiments, and various changes are possible.

For example, according to the above described embodiment, the total of the power consumption amount for the acquiring operation and the power consumption amount for the obtaining operation is set to be equal to or smaller than the upper limit power consumption amount. However, in the actual processing, the power consumption of the initial starting, data output, and end of the satellite radio wave reception processor 48 can be included. In this case, the upper limit power consumption amount including the above power consumption is set, but the power consumption of initial starting and end are expected to be basically a fixed value.

The reference of setting the upper limit power consumption amount can be suitably set within the range that there is no trouble in the counting operation and the display operation of the electronic timepiece 1. The upper limit power consumption amount can be changed based on reasons other than the remaining capacity of the power source 552. For example, the upper limit power consumption amount can be set differently or greatly changed depending on the number of stepping motors which operate the hands in an analog electronic timepiece, a liquid crystal size and display method in a digital electronic timepiece, whether there is a solar battery, and amount of power generation in the solar battery and/or setting of time interval until reception again. On the other hand, the upper limit power consumption amount can be set so as to not change, and simply whether the radio wave reception is possible or not can be determined. In this case, the remaining amount detecting unit 551 can be, for example, a comparator to simply compare the predetermined output voltage and the reference voltage.

The obtaining of the local time information and the computing of the local time can be performed by the CPU 41 instead of performing in the satellite radio wave reception processor 48. The local time setting information 483*b* can be stored in the ROM 42 and the RAM 43. Further, the automatic obtaining of the local time information does not have to be performed.

The number of positioning satellites necessary for positioning is 4, but when the transmission signal of 4 or more positioning satellites are acquired before the end of the acquiring upper limit time, it is possible to suitably set the number of satellites counted until the acquiring operation ends. If 5 satellites or more are acquired, the positioning accuracy increases and further reception is not necessary even when data cannot be obtained in the obtaining operation from a certain positioning satellite. Alternatively, the consumption current for positioning operation is large, so it is not preferable to continue the acquiring operation longer than necessary.

According to the above embodiment, the date and time are corrected when the satellite radio wave is received. Alternatively, the apparatus can be provided with a separate standard radio wave reception unit and correction can be performed with the date/time obtained by receiving the standard radio wave. In this case, the date/time correction history 431 can be updated regardless of whether the date/time is corrected by receiving the standard radio wave or the satellite radio wave.

According to the above embodiment, the reception start timing is controlled based on the present date/time counted by the counter circuit 52, or the present date/time counted by the control unit 482 according to the above present date/time or the date/time of the RTC. However, the radio wave receiver of the present invention holding and counting the second (count) of the 30 second cycle information is enough to control the reception start timing.

In the above embodiments, the digital electronic timepiece 1 including the display unit with the LCD is described, however, the present invention can be used in an analog electronic timepiece which displays using a plurality of hands, or the analog display and the digital display can both be used. The present invention is not limited to an electronic timepiece in which the main purpose is display operation of the time, and can be applied to an electronic device including a counting function and a function to receive satellite radio waves.

According to the above-described embodiment, the radio wave is received from the GPS satellite and positioning is performed. However, the present invention can be applied when the radio wave from the positioning satellite of another positioning system is received. For example, when the positioning satellite of GLONASS is used, the top 4 strings among the 15 strings composing 1 frame are received to obtain the position information of the positioning satellite and the date/time information. The reception start timing and the acquiring upper limit time can be set according to the obtaining term.

According to the above described embodiment, the CPU 41 which performs the program and controls the various control processing with software is described as a processor. Alternatively, a dedicated logic circuit (hardware) can be used alone or together with the above.

According to the present embodiment, a nonvolatile memory such as a flash memory or EEPROM are used as the computer readable medium regarding the storage unit 483 to store the program 483*c* of the present invention, but this is not limited to the above. Other computer readable mediums can be applied such as a HDD (Hard Disk Drive), and portable recording mediums such as a CD-ROM or a DVD disk. The nonvolatile memory can be a detachable portable type such as a mini SD card or a USB memory or an internally mounted type such as a SSD (Solid State Drive). A carrier wave can be applied to the present invention as a medium to provide data of the program of the present invention through communication lines.

Other than the above, details such as the configuration, control, and process shown in the above-described embodiment can be suitably changed within the scope of the present invention.

Although various exemplary embodiments have been shown and described, the invention is not limited to the embodiments shown. Therefore, the scope of the invention is intended to be limited solely by the scope of the claims that follow and its equivalents.

The entire disclosure of Japanese Patent Application No. 2015-054919 filed on Mar. 18, 2015 including specification, claims, drawings and abstract are incorporated herein by reference in its entirety.

What is claimed is:

1. A radio wave receiver comprising:
a radio wave reception processor which receives radio waves and obtains signals transmitted from positioning satellites from the received radio waves;
a processor which sets a reception start timing of the radio waves by the radio wave reception processor and controls the radio wave reception processor to start reception; and
a counter unit which counts a present date/time,
wherein the radio wave reception processor performs a positioning operation including obtaining signals from a number of positioning satellites necessary for computing a present position from the received radio waves,
wherein the processor sets the reception start timing so that following reception conditions are satisfied: (i) a total power consumption amount necessary for the positioning operation including a power amount according to an obtaining upper limit time from a start timing of the positioning operation by the radio wave reception processor to when the radio wave reception processor obtains the signals necessary for computing the present position is equal to or less than a predetermined upper limit power consumption amount, and (ii) the obtaining upper limit time is equal to or more than a predetermined reference time,
wherein the processor corrects the present date/time counted by the counter unit, estimates an error width of the present date/time counted by the counter unit, sets the reception start timing which satisfies the reception conditions even if there is an error in the present date/time within the range of the error width, and controls the radio wave reception processor to start reception based on the present date/time counted by the counter unit, and
wherein, in the reception conditions, the reference time is set shorter as the error width becomes lamer.

2. The radio wave receiver of claim 1, wherein, the processor estimates an error amount for each unit time of the present date/time counted by the counter unit and the error width of the present date/time based on elapsed time from when a previous correction of the present date/time was performed.

3. The radio wave receiver of claim 2, further comprising:
a power supply which obtains a remainder power amount of a power source which supplies power to the radio wave reception processor, and
wherein, in the reception conditions, the upper limit power consumption amount is changed and set according to the remainder power amount.

4. The radio wave receiver of claim 2, wherein the radio wave reception processor computes the present position based on the obtained signals.

5. The radio wave receiver of claim 1, further comprising:
a power supply which obtains a remainder power amount of a power source which supplies power to the radio wave reception processor, and
wherein, in the reception conditions, the upper limit power consumption amount is changed and set according to the remainder power amount.

6. The radio wave receiver of claim 1, wherein the radio wave reception processor computes the present position based on the obtained signals.

7. The radio wave receiver of claim 6, wherein the radio wave reception processor obtains local time information according to the computed present position and obtains local time according to the present date/time based on the obtained local time information.

8. A radio-controlled timepiece comprising:
the radio wave receiver of claim 7; and
a display,
wherein the processor displays, on the display, local time obtained by the radio wave reception processor.

9. A radio-controlled timepiece comprising:
the radio wave receiver of claim 6; and
a display,
wherein the processor controls the display to display the present date/time and information regarding the present position computed by the radio wave reception processor simultaneously or selectively.

10. A radio wave receiver comprising:
a radio wave reception processor which receives radio waves and obtains signals transmitted from positioning satellites from the received radio waves;
a processor which sets a reception start timing of the radio waves by the radio wave reception processor and controls the radio wave reception processor to start reception; and
a counter unit which counts a present date/time,
wherein the radio wave reception processor performs a positioning operation including obtaining signals from a number of positioning satellites necessary for computing a present position from the received radio waves,
wherein the processor sets the reception start timing so that following reception conditions are satisfied: (i) a total power consumption amount necessary for the positioning operation including a power amount according to an obtaining upper limit time from a start timing of the positioning operation by the radio wave reception processor to when the radio wave reception processor obtains the signals necessary for computing the present position is equal to or less than a predetermined upper limit power consumption amount, and (ii) the obtaining upper limit time is equal to or more than a predetermined reference time, wherein the processor corrects the present date/time counted by the counter unit, estimates an error width of the present date/time counted by the counter unit, sets the reception start timing which satisfies the reception conditions even if there is an error in the present date/time within the range of the error width, and controls the radio wave reception processor to start reception based on the present date/time counted by the counter unit, and
wherein, the processor estimates an error amount for each unit time of the present date/time counted by the counter unit and the error width of the present date/time based on elapsed time from when a previous correction of the present date/time was performed.

11. The radio wave receiver of claim 10, further comprising:
a power supply which obtains a remainder power amount of a power source which supplies power to the radio wave reception processor, and
wherein, in the reception conditions, the upper limit power consumption amount is changed and set according to the remainder power amount.

12. The radio wave receiver of claim 10, wherein the radio wave reception processor computes the present position based on the obtained signals.

13. A radio wave receiver of claim 1, further comprising:
a radio wave reception processor which receives radio waves and obtains signals transmitted from positioning satellites from the received radio waves;
a processor which sets a reception start timing of the radio waves by the radio wave reception processor and controls the radio wave reception processor to start reception; and
a power supply which obtains a remainder power amount of a power source which supplies power to the radio wave reception processor,
wherein the radio wave reception processor performs a positioning operation including obtaining signals from a number of positioning satellites necessary for computing a present position from the received radio waves,
wherein the processor sets the reception start timing so that following reception conditions are satisfied: (i) a total power consumption amount necessary for the positioning operation including a power amount according to an obtaining upper limit time from a start timing of the positioning operation by the radio wave reception processor to when the radio wave reception processor obtains the signals necessary for computing the present position is equal to or less than a predetermined upper limit power consumption amount, and (ii) the obtaining upper limit time is equal to or more than a predetermined reference time, and
wherein, in the reception conditions, the upper limit power consumption amount is changed and set according to the remainder power amount.

14. A signal obtaining method comprising:
performing a positioning operation including obtaining signals from a number of positioning satellites necessary for computing a present position from received radio waves, and computing the present position based on the obtained signals;
controlling reception of the radio waves by setting a reception start timing of the radio waves and controlling starting of reception of the radio waves; and counting a present date/time, wherein, in the reception controlling, the reception start timing is set so that following reception conditions are satisfied: (i) a total power consumption amount of a power amount necessary for computing the present position and a power amount according to an obtaining upper limit time from a start timing of the positioning operation to when the signals necessary for computing the present position are obtained is equal to or less than a predetermined upper limit power consumption amount, and (ii) the obtaining upper limit time is equal to or more than a predetermined reference time, wherein the method further comprises correcting the counted present date/time and estimating an error width of the counted present date/time, wherein the reception start timing is set to satisfy the reception conditions even if there is an error in the present date/time within the range of the error width, and the reception of the radio waves is controlled to start based on the counted present date/time, and wherein, in the reception conditions, the reference time is set shorter as the error width becomes larger.

15. A signal obtaining method comprising:

performing a positioning operation including obtaining signals from a number of positioning satellites necessary for computing a present position from received radio waves, and computing the present position based on the obtained signals;

controlling reception of the radio waves by setting a reception start timing of the radio waves and controlling starting of reception of the radio waves; and counting a present date/time, wherein, in the reception controlling, the reception start timing is set so that following reception conditions are satisfied: (i) a total power consumption amount of a power amount necessary for computing the present position and a power amount according to an obtaining upper limit time from a start timing of the positioning operation to when the signals necessary for computing the present position are obtained is equal to or less than a predetermined upper limit power consumption amount, and (ii) the obtaining upper limit time is equal to or more than a predetermined reference time, wherein the method further comprises correcting the counted present date/time and estimating an error width of the counted present date/time, wherein the reception start timing is set to satisfy the reception conditions even if there is an error in the present date/time within the range of the error width, and the reception of the radio waves is controlled to start based on the counted present date/time, and wherein the method further comprises estimating an error amount for each unit time of the counted present date/time and the error width based on elapsed time from when a previous correction of the present date/time was performed.

16. A signal obtaining method comprising:

performing, by a radio wave reception processor, a positioning operation including obtaining signals from a number of positioning satellites necessary for computing a present position from received radio waves, and computing the present position based on the obtained signals;

controlling reception of the radio waves by setting a reception start timing of the radio waves and controlling starting of reception of the radio waves; and obtaining a remainder power amount of a power source which supplies power to the radio wave reception processor, wherein, in the reception controlling, the reception start timing is set so that following reception conditions are satisfied: (i) a total power consumption amount of a power amount necessary for computing the present position and a power amount according to an obtaining upper limit time from a start timing of the positioning operation to when the signals necessary for computing the present position are obtained is equal to or less than a predetermined upper limit power consumption amount, and (ii) the obtaining upper limit time is equal to or more than a predetermined reference time, and wherein, in the reception conditions, the upper limit power consumption amount is changed and set according to the remainder power amount.

* * * * *

UNITED STATES PATENT AND TRADEMARK OFFICE
CERTIFICATE OF CORRECTION

PATENT NO. : 10,031,488 B2  
APPLICATION NO. : 15/455753  
DATED : July 24, 2018  
INVENTOR(S) : Yuki Oshita Page 1 of 1

It is certified that error appears in the above-identified patent and that said Letters Patent is hereby corrected as shown below:

In the Claims

Column 18, Line 64, Claim 1, Line 37, delete "lamer." and insert --larger.--.

Column 20, Line 27, Claim 13, Line 1, after "receiver" delete "of claim 1, further".

Signed and Sealed this  
Thirtieth Day of October, 2018

Andrei Iancu  
*Director of the United States Patent and Trademark Office*